US011225172B2

(12) United States Patent
Mozurkewich et al.

(10) Patent No.: US 11,225,172 B2
(45) Date of Patent: Jan. 18, 2022

(54) LATERALLY TRANSLATING SEAT PEDESTAL

(71) Applicant: Ford Global Technologies, LLC, Dearborn, MI (US)

(72) Inventors: Kevin Mozurkewich, Milford, MI (US); John Wayne Jaranson, Dearborn, MI (US); Marcos Silva Kondrad, Macomb Township, MI (US); Kevin VanNieulande, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 16/878,769

(22) Filed: May 20, 2020

(65) Prior Publication Data

US 2021/0362627 A1 Nov. 25, 2021

(51) Int. Cl.
*B60N 2/06* (2006.01)
*B60N 2/14* (2006.01)
*B60N 2/01* (2006.01)
*B60N 2/005* (2006.01)
*B60R 13/02* (2006.01)

(52) U.S. Cl.
CPC ............ *B60N 2/062* (2013.01); *B60N 2/01* (2013.01); *B60N 2/14* (2013.01); *B60R 13/0237* (2013.01); *B60N 2/005* (2013.01); *B60N 2/012* (2013.01)

(58) Field of Classification Search
CPC ........ B60N 2/00; B60N 2/005; B60N 2/0237; B60N 2/062; B60N 2/01; B60N 2/012; B60N 2/14; B60R 13/0237

USPC .................. 296/64, 65.11, 65.01, 65.06, 337
See application file for complete search history.

(56) References Cited

U.S. PATENT DOCUMENTS

| 2,753,947 | A | 7/1956 | Mach |
| 2,758,872 | A | 8/1956 | Solomon et al. |
| 2,858,877 | A | 11/1958 | Krause |
| 3,071,407 | A | 1/1963 | Sloan |
| 5,632,521 | A | 5/1997 | Archambault et al. |
| 5,636,884 | A | 6/1997 | Ladetto et al. |
| 5,769,480 | A | 6/1998 | Gebhardt |
| 6,129,405 | A | 10/2000 | Miyahara et al. |
| 6,557,919 | B2 | 5/2003 | Suga et al. |
| 6,648,393 | B1 | 11/2003 | Milnar et al. |
| 9,855,861 | B2 | 1/2018 | Supemavage et al. |
| 9,873,354 | B2 | 1/2018 | Poulos et al. |

(Continued)

*Primary Examiner* — Dennis H Redder
*Assistant Examiner* — Joyce Eileen Hill
(74) *Attorney, Agent, or Firm* — David Coppiellie; Price Heneveld LLP

(57) ABSTRACT

A vehicle includes a vehicle interior having opposed first and second sides and a support surface disposed therebetween. A track system is laterally disposed on the support surface. A seat pedestal includes a base portion supported on the track system for lateral movement within the vehicle interior. The seat pedestal further includes a seat portion rotatably supported on the base portion. A first interior trim member includes an outer surface facing inwardly into the vehicle interior in a lateral direction. The first interior trim member includes a seatback integrated into the outer surface thereof. A second interior trim member includes an outer surface facing inwardly into the vehicle interior in a rearward direction. The second interior trim member includes a seatback integrated into the outer surface thereof.

20 Claims, 7 Drawing Sheets

(56) References Cited

U.S. PATENT DOCUMENTS

| | | | |
|---|---|---|---|
| 10,046,675 B1* | 8/2018 | Whitens | B60N 2/14 |
| 10,486,558 B1 | 11/2019 | Baccouche et al. | |
| 10,500,988 B1 | 12/2019 | Faruque et al. | |
| 10,800,293 B2* | 10/2020 | Prozzi | B60N 2/01516 |
| 2006/0220411 A1 | 10/2006 | Pathak et al. | |
| 2018/0251042 A1 | 9/2018 | Baccouche et al. | |
| 2019/0126784 A1* | 5/2019 | Dry | B60N 2/0715 |
| 2020/0086768 A1* | 3/2020 | Line | B60N 2/0806 |
| 2020/0215944 A1* | 7/2020 | Gomez | B60N 2/005 |

\* cited by examiner

LATERALLY TRANSLATING SEAT PEDESTAL

FIELD OF THE INVENTION

The present invention generally relates to a laterally translating seat pedestal, and, more particularly, to a laterally translating seat pedestal that is configured to provide multiple seating options within a vehicle interior.

BACKGROUND OF THE INVENTION

Adjustable seat options are desired for second or third row seating options. The present concept provides adjustability and reconfigurable seating options for vehicle occupants.

SUMMARY OF THE INVENTION

According to one aspect of the present invention, a vehicle includes a vehicle interior having a front portion, a rear portion, opposed first and second sides and a support surface. A track system is disposed on the support surface and includes at least one track member. The at least one track member is positioned on the support surface substantially spanning a distance defined between the opposed first and second sides of the vehicle interior. A seat pedestal includes a base portion supported on the track system for lateral movement within the vehicle interior. The seat pedestal further includes a seat portion rotatably supported on the base portion. A first interior trim member is positioned along one of the first and second sides of the vehicle interior. The first interior trim member includes a side-facing seatback disposed on an outer surface thereof. A second interior trim member is facing rearwardly within the vehicle interior. The second interior trim member includes a rear-facing seatback disposed on an outer surface thereof.

According to another aspect of the present invention, a vehicle includes a vehicle interior having opposed first and second sides and a support surface disposed therebetween. A track system is laterally disposed on the support surface. A seat pedestal includes a base portion supported on the track system for lateral movement within the vehicle interior. The seat pedestal further includes a seat portion rotatably supported on the base portion. A first interior trim member includes an outer surface facing inwardly into the vehicle interior in a lateral direction. The first interior trim member includes a seatback integrated into the outer surface thereof. A second interior trim member includes an outer surface facing inwardly into the vehicle interior in a rearward direction. The second interior trim member includes a seatback integrated into the outer surface thereof.

According to yet another aspect of the present invention, a vehicle includes a vehicle interior having opposed first and second sides and a support surface disposed therebetween. A track system is laterally disposed on the support surface. A seat pedestal is supported on the track system for lateral movement within the vehicle interior between a use position and a loading position. An interior trim member is disposed on the first side of the vehicle interior and includes a seatback aligned with the seat pedestal. The seat pedestal moves towards the seatback as the seat pedestal moves towards the use position along the track system. The seat pedestal moves away from the seatback as the seat pedestal moves towards the loading position along the track system.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
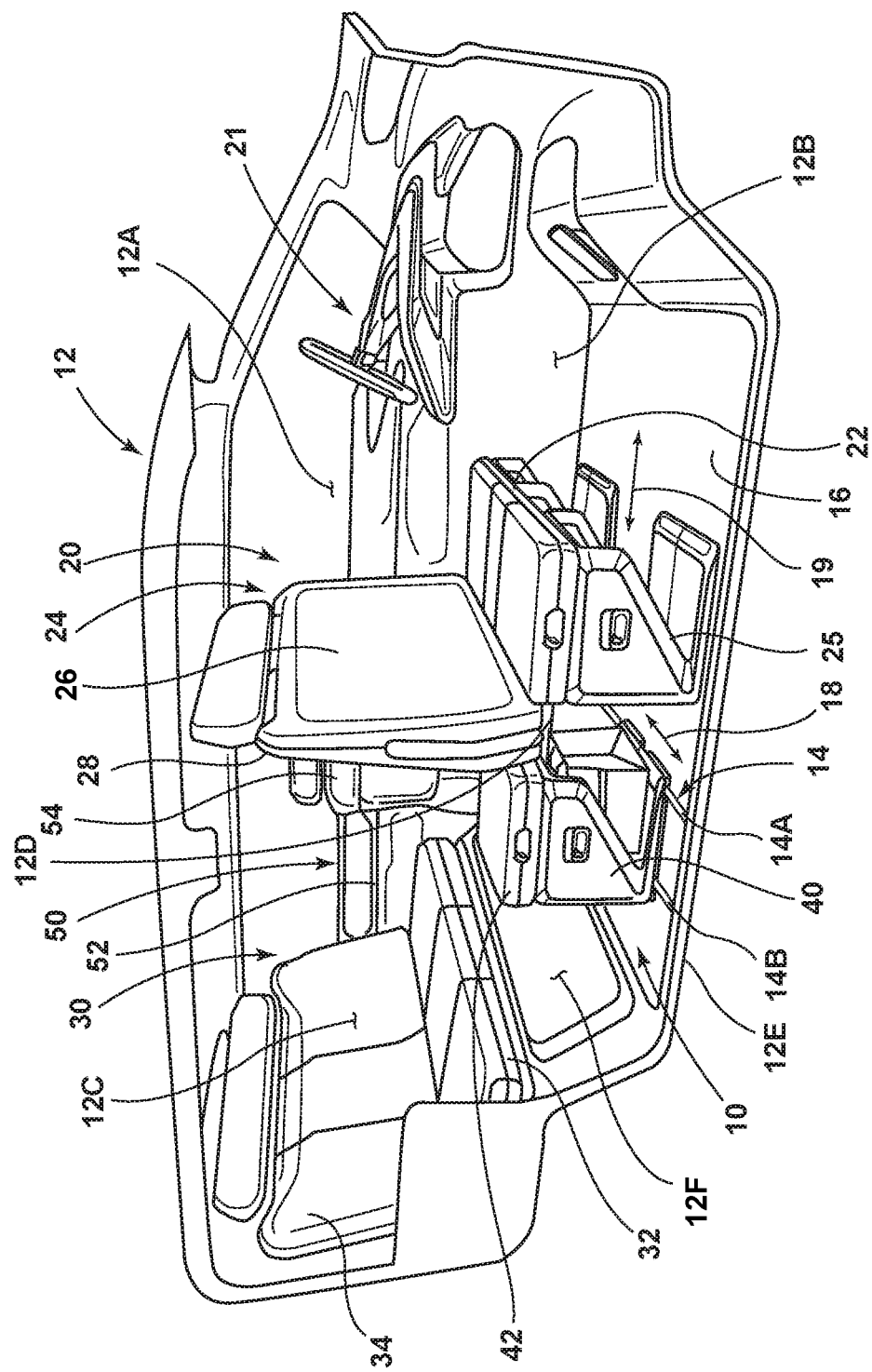
FIG. 1 is a top perspective view of a vehicle interior having a laterally translating seat pedestal.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat pedestal 10 is shown disposed within a vehicle interior 12A of a vehicle 12. The vehicle interior 12A includes a front portion 12B, a rear portion 12C, and an intermediate portion 12F disposed between the front and rear portions 12B, 12C. The vehicle interior 12A further includes opposed first and second sides 12D, 12E and a support surface 16 disposed therebetween. In FIG. 1, the seat pedestal 10 is disposed within the vehicle interior 12A in the intermediate portion 12F of the vehicle interior 12A, however, it is contemplated that the seat pedestal 10, or various components and features thereof, can be disposed in other areas of a vehicle interior 12A. The seat pedestal 10 is operably coupled to the vehicle 12 on a track system 14 having first and second track members 14A, 14B that are parallel to one another. The track system 14 is positioned on or within the support surface 16 of the vehicle 12, and generally extends between opposed first and second sides 12D, 12E of the vehicle interior 12A. In this way, the seat pedestal 10 is configured to move laterally in the direction as indicated by arrow 18 within the vehicle interior 12A, as further described below. The track system 14 may include a track system, such as the track system disclosed in U.S. patent application Ser. No. 16/452,985, filed Jun. 26, 2019, which is hereby incorporated by reference in its entirety.

The seat pedestal 10, as set forth herein, is generally configured for use as a second row seating option for a vehicle. It is contemplated that the vehicle 12 shown in FIG. 1 may be a sport utility vehicle, a van, a car, etc. It is also contemplated that the seat pedestal 10 can take on a variety of configurations, and is not limited to the structure or vehicle position shown in the accompanying figures.

With further reference to FIG. 1, a first seat assembly 20 is shown positioned in the front portion 12B of the vehicle interior 12A. The first seat assembly 20 includes a seat portion 22 and a seatback portion 24. The first seat assembly 20 is contemplated to be a front row seat assembly that is supported on the support surface 16 of the vehicle 12 by a base portion 25 to forwardly face an instrument panel 21 of the vehicle 12. The seatback portion 24 of the first seat assembly 20 includes a front surface 26 defining a forward-facing seatback for supporting a back portion of a seat occupant seated in the first seat assembly 20. The front surface 26 is contemplated to be a cushioned front surface for providing a comfortable and supportive seatback to a seat occupant. The first seat assembly 20 further includes a rearwardly facing interior trim member 28 that is generally positioned in an opposed position relative to the front surface 26 on an opposite side of the seatback portion 24. The interior trim member 28 of the seatback portion 24 defines a second interior trim member of the vehicle 12, as further described below. As shown in FIG. 1, the interior trim member 28 of the first seat assembly 20 faces a second seat assembly 30 that is rearwardly spaced-apart from the first seat assembly 20 within the vehicle interior 12A. The second seat assembly 30 is contemplated to be a rear seat assembly or third row seat assembly that is supported on the support surface 16 of the vehicle 12 within the rear portion 12C of the vehicle interior 12A. As shown in FIG. 1, the second seat assembly 30 forwardly faces the interior trim member 28 of the first seat assembly 20. The intermediate portion 12F of the vehicle interior 12A is defined between the first and second seat assemblies 20, 30. The seat pedestal 10 is positioned within the intermediate portion 12F between the first and second seat assemblies 20, 30 as an exemplary positioning, but other locations for the seat pedestal 10 are also contemplated. The first and second seat assemblies 20, 30 may be referred to herein as a front and rear seat assemblies given their relative positions within the vehicle interior 12A shown in FIG. 1.

As shown in FIG. 1, the track system 14 is disposed on the support surface 16 and the first and second track members 14A, 14B thereof substantially span a distance defined between the opposed first and second sides 12D, 12E of the vehicle interior 12A. The seat pedestal 10 is shown having a base portion 40 supported on the track system 14 for lateral movement within the vehicle interior 12A in the direction as indicated by arrow 18. The seat pedestal 10 further includes a seat portion 42 rotatably supported on the base portion 40, as further described below. As used herein, the term "laterally" describes a movement of an object in a side-to-side direction as opposed to a fore and aft direction. For instance, the seat pedestal 10 is configured to move in the lateral direction indicated by arrow 18 between the first and second sides 12D, 12E of the vehicle interior 12A along the support surface 16. This lateral movement of the seat pedestal 10 in the direction indicated by arrow 18 is substantially perpendicular to a fore and aft direction indicated by arrow 19. The fore and aft direction indicated by arrow 19 may be referred to herein as a car-forward and car-rearward direction. Further, as used herein, the terms "substantial," "substantially," and variations thereof, are intended to note that a described feature is equal or approximately equal to a value or description. For example, "substantially perpendicular" is intended to denote a feature that is perpendicular or approximately perpendicular to another feature. Moreover, "substantially" is intended to denote that two values are equal or approximately equal. In some embodiments, "substantially" may denote values within about 10% of each other, such as within about 5% of each other, or within about 2% of each other.

As further shown in FIG. 1, a first interior trim member 50 is positioned along the first side 12D of the vehicle interior 12A, and includes a side-facing seatback 54 disposed on an outer surface 52 of the first interior trim member 50. The side-facing seatback 54 is contemplated to be integrated into the outer surface 52 of the first interior trim member 50. As further described below, the second interior trim member 28 includes an outer surface 56 (FIG. 2) having a rear-facing seatback 58 disposed thereon. As further described below, the seat pedestal 10 is configured to move between multiple positions to provide multiple seating configurations for the vehicle 12. The positions of the seat pedestal 10 along the track system 14 may be described as positions of the seat pedestal 10 itself, or the base portion 40 thereof.

Figure 2:
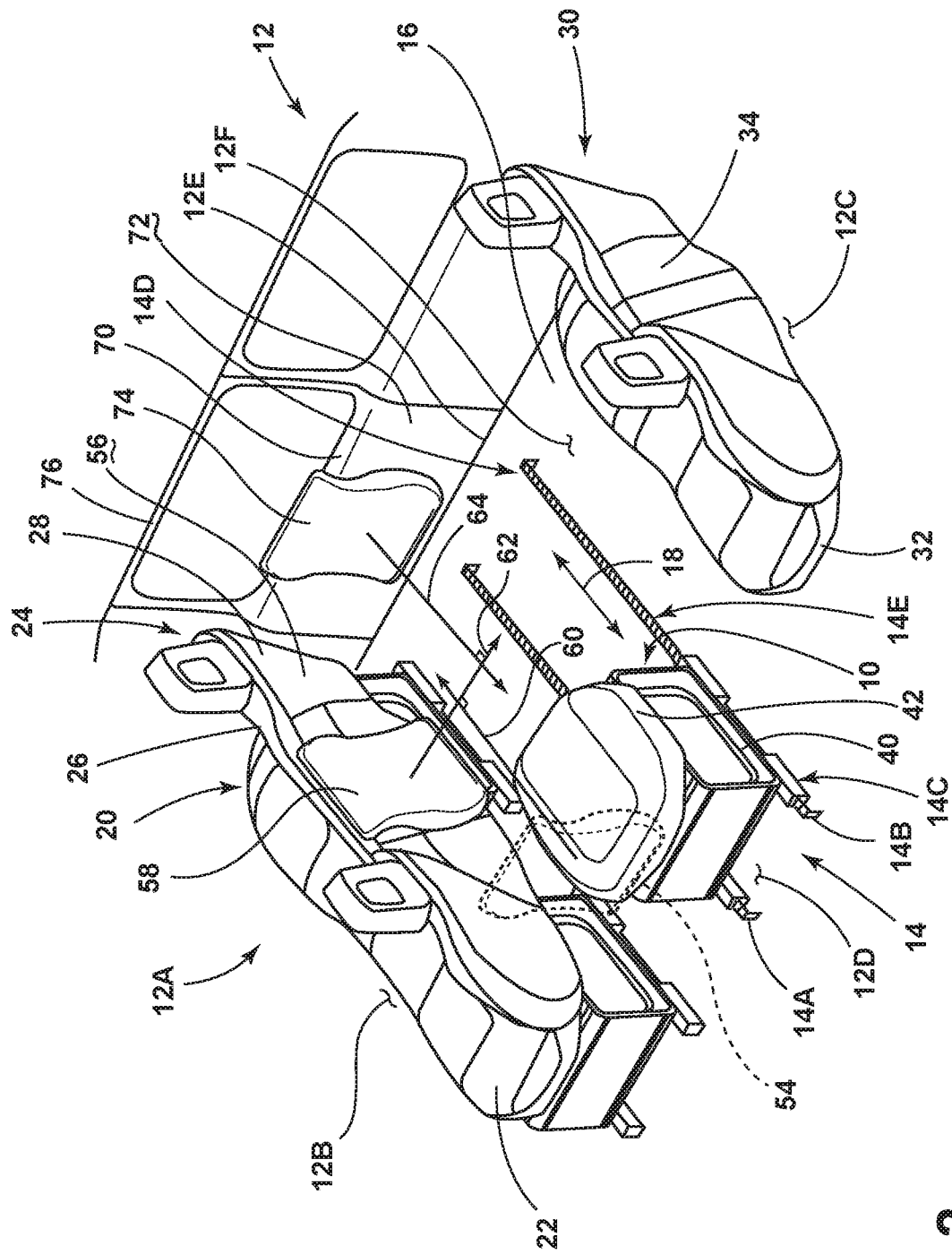
FIG. 2 is a top perspective view of a vehicle interior showing a seat pedestal supported on a track system in a first position and a first orientation to provide a first seating configuration.

Referring now to FIG. 2, the base portion 40 of the seat pedestal 10 moves along the track system 14 between first and second positions to define first, second and third positions of the seat pedestal 10. In FIG. 2, the seat pedestal 10 is shown in the first position, wherein the base portion 40 is positioned adjacent to the side-facing seatback 54 of the first interior trim member 50 (FIG. 1). The side-facing seatback 54 faces inwardly into the vehicle interior 12A from the first side 12D of the vehicle interior 12A in a lateral direction as indicated by arrow 60. As shown in FIG. 2, the track system 14 includes first and second ends 14C, 14D with an intermediate portion 14E disposed therebetween. In the first position, the seat pedestal 10 is disposed proximate to the first end 14C of the track system 14. Thus, the first end 14C of the track system 14 corresponds to the first position of the base portion 40 of the seat pedestal 10, wherein the seat pedestal 10 is disposed adjacent to the side-facing seatback 54. The seat pedestal 10 and the side-facing seatback 54 of the first interior trim member 50 (FIG. 1) defines a first seating configuration, as further described below. The first seating configuration may also be described herein as a use position of the seat pedestal 10, in that the seat pedestal 10 can be used to support a pedestal occupant in a seated configuration when the seat pedestal 10 is in the first position adjacent the side-facing seatback 54.

As further shown in FIG. 2, the second interior trim member 28 includes the rear-facing seatback 58 disposed on the outer surface 56 of the second interior trim member 28. Thus, the second interior trim member 28 is disposed on the rear portion of the seatback portion 24 of the first seat assembly 20. The rear-facing seatback 58 faces inwardly into the vehicle interior 12A in a car-rearward direction as indicated by arrow 62. The car-rearward direction indicated by arrow 62 is substantially perpendicular to the side-facing direction indicated by arrow 60 of the side-facing seatback 54. As such, the side-facing seatback 54 and the rear-facing seatback 58 are contemplated to be substantially perpendicular to one another in that they face respective directions 60, 62 that are substantially perpendicular to one another. As further shown in FIG. 2, a third interior trim member 70 is disposed on the second side 12E of the vehicle interior 12A. The third interior trim member 70 includes an outer surface 72 having a side-facing seatback 74 integrated into the outer surface 72 that faces inwardly into the vehicle interior 12A from the first side 12D of the vehicle interior 12A in a lateral direction as indicated by arrow 64. As such, the side-facing seatback 74 and the rear-facing seatback 58 are also contemplated to be substantially perpendicular to one another in that they face respective directions 64, 62 that are substantially perpendicular to one another. The side-facing seatback 54 and the side-facing seatback 74 face inwardly into the vehicle interior towards one another in the opposed lateral directions as indicated by arrows 60, 64. In this way the side-facing seatback 54, 74 are configured in opposed directions to one another. As further shown in FIG. 2, the third interior trim member 70, and the side-facing seatback 74 thereof, may be disposed on a door 76 of the vehicle 12 for sliding movement therewith.

Figure 3:
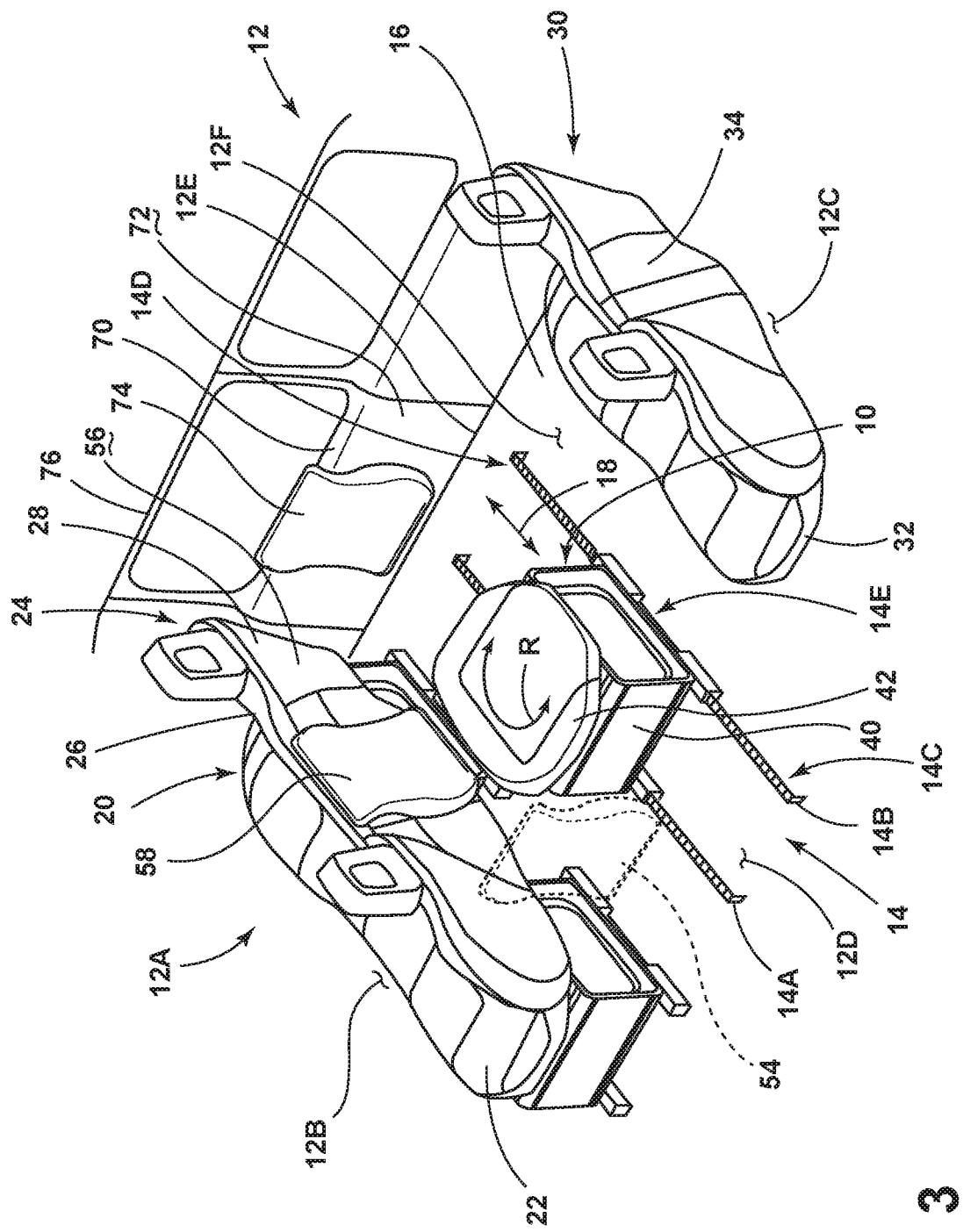
FIG. 3 is a top perspective view of the vehicle interior of FIG. 2 showing the seat pedestal supported on the track system in a second position and a second orientation to provide a second seating configuration.

With reference to FIG. 3, the seat pedestal 10 is in the second position, wherein the base portion 40 is positioned adjacent to the rear-facing seatback 58. As noted above, the seat portion 42 of the seat pedestal 10 is rotatable as supported on the base portion 40. The seat portion 42 of the seat pedestal 10 may rotate a full 360° on the base portion 40, or the rotation of the seat portion may be limited. Between FIGS. 2 and 3, the seat portion 42 of the seat pedestal 10 is shown rotated between first and second orientations on the base portion 40 in the direction as indicated by arrow R. The first and second orientations of the seat portion 42 are substantially perpendicular to one another.

Referring again to FIG. 2, the seat portion 42 is positioned in a side-facing orientation facing the second side 12E of the vehicle interior 12A. When the seat pedestal 10 is in the first position and the seat portion 42 of the seat pedestal 10 is in the first orientation, the seat pedestal 10 provides a first seating configuration, as shown in FIG. 2. The first seating configuration corresponds to the seat pedestal 10 being disposed adjacent to the side-facing seatback 54, such that a user may be seated on the seat portion 42 of the seat pedestal 10 while using the back support provided by the side-facing seatback 54. The side-facing seatback 54 is contemplated to be a fixed orientation seatback that faces the second side 12E of the vehicle interior 12A from the first side 12D of the vehicle interior 12A in the lateral direction as indicated by arrow 60. The seat portion 42 of the seat pedestal 10 also faces in the side-facing direction as indicated by arrow 60 when the seat portion 42 of the seat pedestal 10 is in the first orientation. While the side-facing seatback 54 is contemplated to be a fixed orientation seatback, it is contemplated that the side-facing seatback 54 may include various reclining or adjustable lumbar support features while fixed in a generally outwardly facing position.

With further reference to FIG. 3, the seat pedestal 10 provides a second seating configuration that is different than the first seating configuration shown in FIG. 2. The second seating configuration is provided when the seat portion 42 of the seat pedestal 10 is in the second orientation shown in FIG. 3, and the base portion 40 is in the second position adjacent the rear-facing seatback 58. The intermediate portion 14E of the track system 14 corresponds to the second position of the base portion 40 of the seat pedestal 10. The second orientation of the seat portion 42 of the seat pedestal 10 is a rearwardly facing orientation, as shown in FIG. 3. The second seating configuration is provided, such that a user may be seated on the seat portion 42 of the seat pedestal 10 while using the back support provided by the rear-facing seatback 58 of the first interior trim member 28. In moving from the first seating configuration shown in FIG. 2 to the second seating configuration shown in FIG. 3, the seat pedestal 10 moves laterally along the track system 14 from the first position (proximate the first end 14C of the track system 14) to the second position (proximate the intermediate portion 14E of the track system 14). In this way, the seat pedestal 10 is a laterally translating seat pedestal allowing for lateral movement within the vehicle interior 12A. Further, in moving from the first seating configuration shown in FIG. 2 to the second seating configuration shown in FIG. 3, the seat portion 42 of the seat pedestal 10 rotates in the direction as indicated by arrow R from the side-facing first orientation (shown in FIG. 2) to the rear-facing second orientation (shown in FIG. 3). Rotational movement of the seat portion 42 on the base portion 40 of the seat pedestal 10 may be a powered movement or a manually powered movement. Similarly, the lateral translation of the seat pedestal 10 from the first position to the second position may be a powered movement for a manually powered. When the seat pedestal 10 is contemplated to be a powered seat pedestal, the lateral translating movement from the first position to the second position may occur simultaneously with rotation of the seat portion 42 upon the base portion 40. In this way, lateral translation of the seat pedestal 10 and rotational movement of the seat portion 42 may be synchronized.

Figure 4:
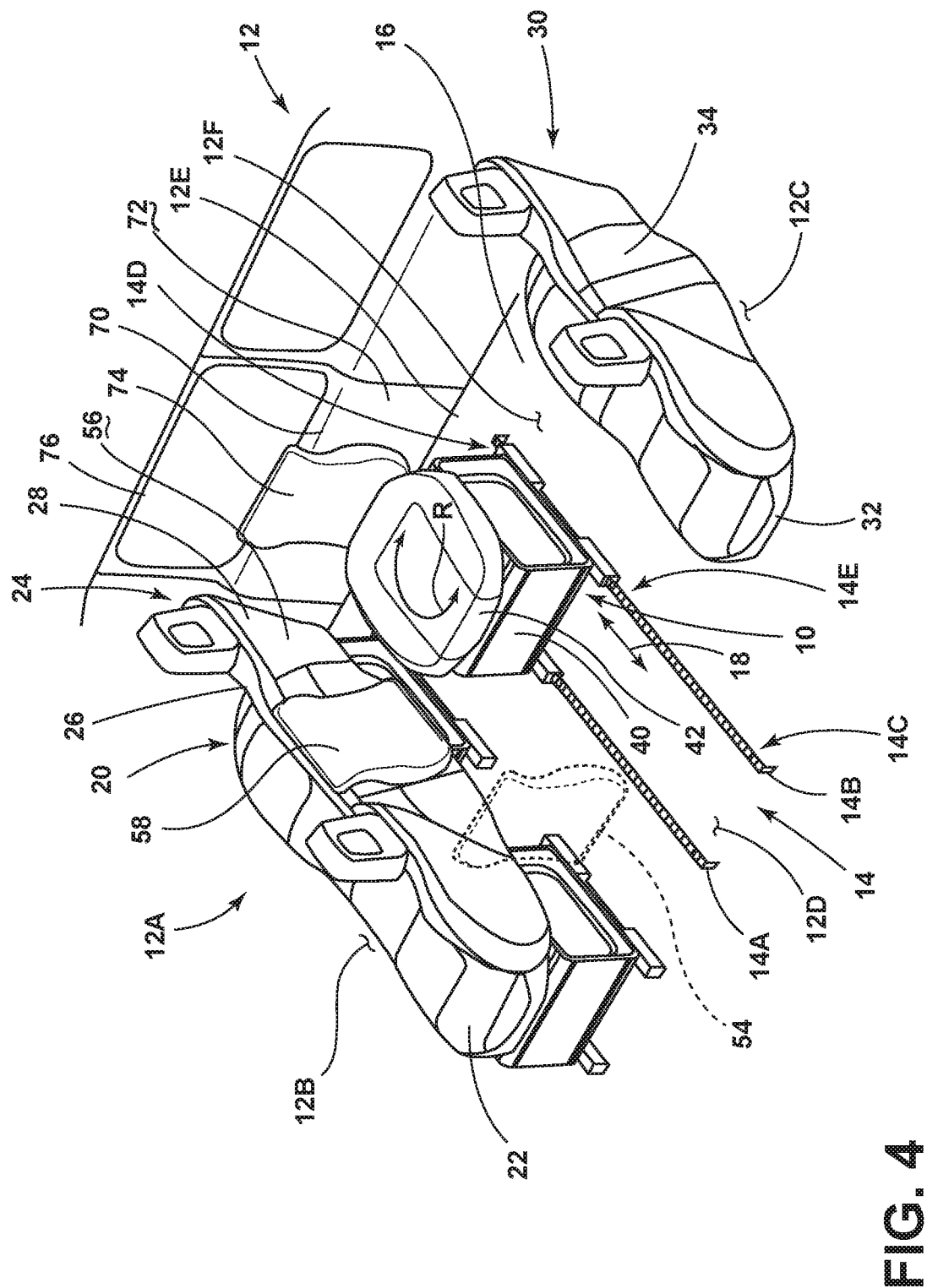
FIG. 4 is a top perspective view of the vehicle interior of FIG. 3 showing the seat pedestal supported on the track system in a third position and a third orientation to provide a third seating configuration.

Referring now to FIG. 4, the seat pedestal 10 provides a third seating configuration that is different than the first and second seating configurations shown in FIGS. 2 and 3. The third seating configuration is provided when the seat portion 42 of the seat pedestal 10 is in a third orientation shown in FIG. 4, and the base portion 40 is in a third position adjacent the side-facing seatback 74. The second end 14D of the track system 14 corresponds to the third position of the base portion 40 of the seat pedestal 10. The third orientation of the seat portion 42 of the seat pedestal 10 is a side-facing orientation, as shown in FIG. 4, that is opposed to the side-facing second orientation of the seat portion 42 of the seat pedestal 10 shown in FIG. 2. The third seating configuration is provided, such that a user may be seated on the seat portion 42 of the seat pedestal 10 while using the back support provided by the side-facing seatback 74 of the third interior trim member 70. In moving from the first seating configuration shown in FIG. 2 or the second seating configuration shown in FIG. 3 to the third seating configuration shown in FIG. 4, the seat pedestal 10 moves laterally along the track system 14 from the first position (proximate the first end 14C of the track system 14), or from the second position (proximate the intermediate portion 14E of the track system 14) to the third position disposed proximate the second end 14D of the track system 14. In this way, the laterally translating movement of the seat pedestal 10 substantially spans the distance between the first and second sides 12D, 12E of the vehicle interior 12A. This is generally due to the track system 14 spanning the distance between the first and second sides 12D, 12E of the vehicle interior 12A. Further, in moving from either the first seating configuration shown in FIG. 2 or the second seating configuration shown in FIG. 3 to the third seating configuration shown in FIG. 4, the seat portion 42 of the seat pedestal 10 rotates in the direction as indicated by arrow R from either the side-facing first orientation (shown in FIG. 2) or the rear-facing second orientation (shown in FIG. 3), to the side-facing third orientation shown in FIG. 4. As noted above, the seat pedestal 10 provides the third seating configuration when the seat portion 42 of the seat pedestal 10 is in the third orientation, that is opposed to the first orientation, and the base portion 40 of the seat pedestal 10 is in the third position at the second end 14D of the track system 14.

Figure 5:
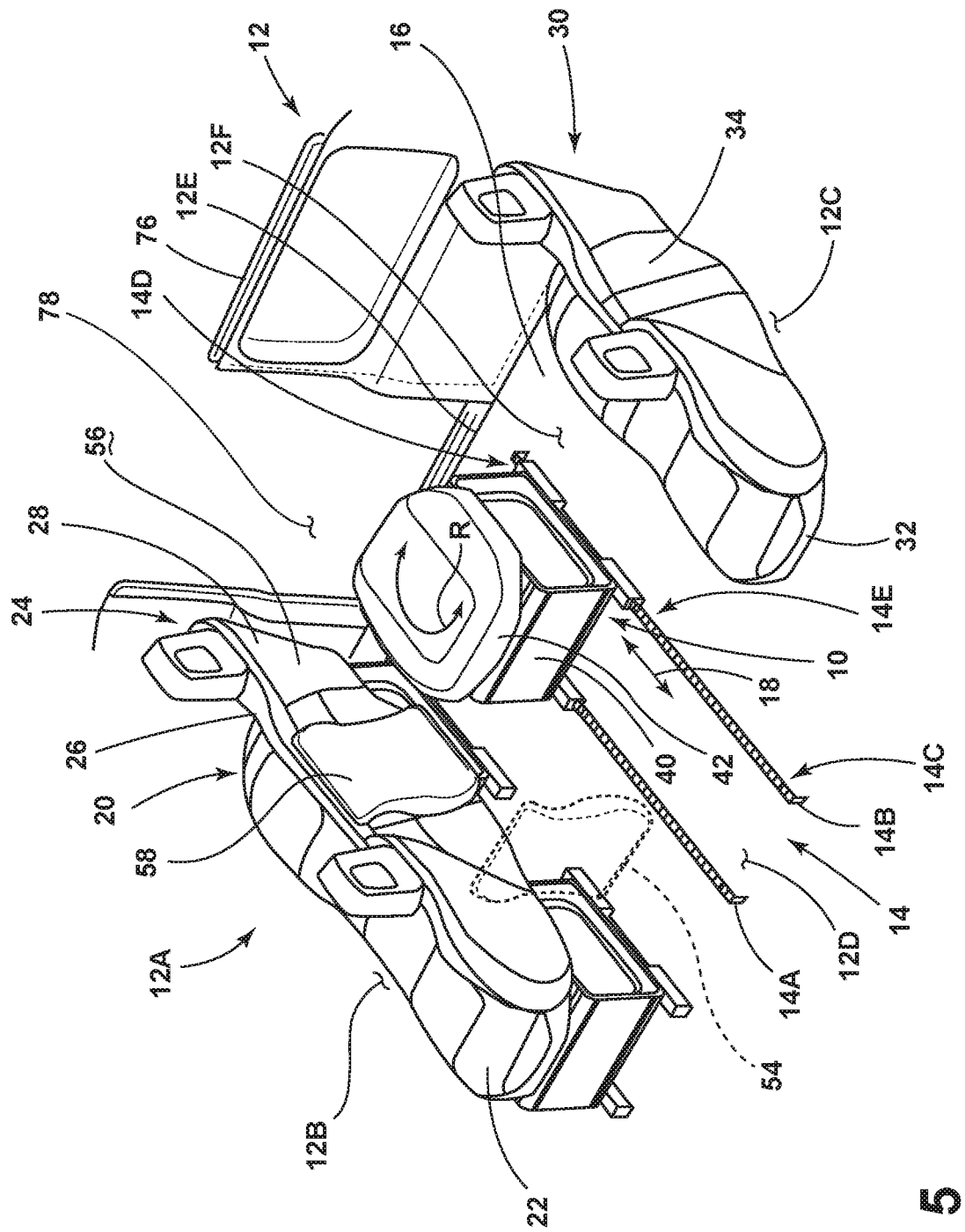
FIG. 5 is a top perspective view of the vehicle interior of FIG. 2 with a door shown in an open position and the seat pedestal shown in a loading configuration.

Referring now to FIG. 5, the vehicle 12 is shown with the door 76 in an open condition to provide an opening 78 configured for ingress and egress of vehicle occupants into and out of the vehicle interior 12A. The seat pedestal 10 provides a loading configuration when the seat portion 42 of the seat pedestal 10 is in the first orientation and the base portion 40 of the seat pedestal 10 is in the third position that corresponds to the second end 14D of the track system 14. In this way, a seat pedestal occupant can access the seat pedestal 10 from the second side 12E of the vehicle interior 12A at the opening 78. Once seated on the seat pedestal 10, the pedestal occupant can move the seat pedestal 10 from the third position to the first position by moving the seat pedestal 10 from the second end 14D of the track system 14 to the first end 14C of the track system 14 to provide the first seating configuration adjacent the side-facing seatback 54. As noted above, the seat pedestal occupant can also move the seat pedestal 10 to the second position at the intermediate portion 14E of the track system 14, and rotate the seat portion 42 of the seat pedestal 10 to the second orientation to provide the second seating configuration shown in FIG. 3 adjacent the rear-facing seatback 58. The loading configuration of the seat pedestal 10 shown in FIG. 5 can also be used to load a car seat that would otherwise be difficult to load from the open door at the second side 12E of the vehicle interior 12A.

Having the laterally translating seat pedestal 10 of the present concept, a seating option is provided between the first and second seat assemblies 20, 30, wherein a pedestal occupant can be positioned to face the second seat assembly 30 and the rear-facing second seating configuration, or be positioned in the side-facing position of the first seating configuration. The side-facing position offered by the first seating configuration is contemplated to be a less awkward can configuration for pedestal occupant when there are passengers seated in the second seat assembly 30.

Figure 6:
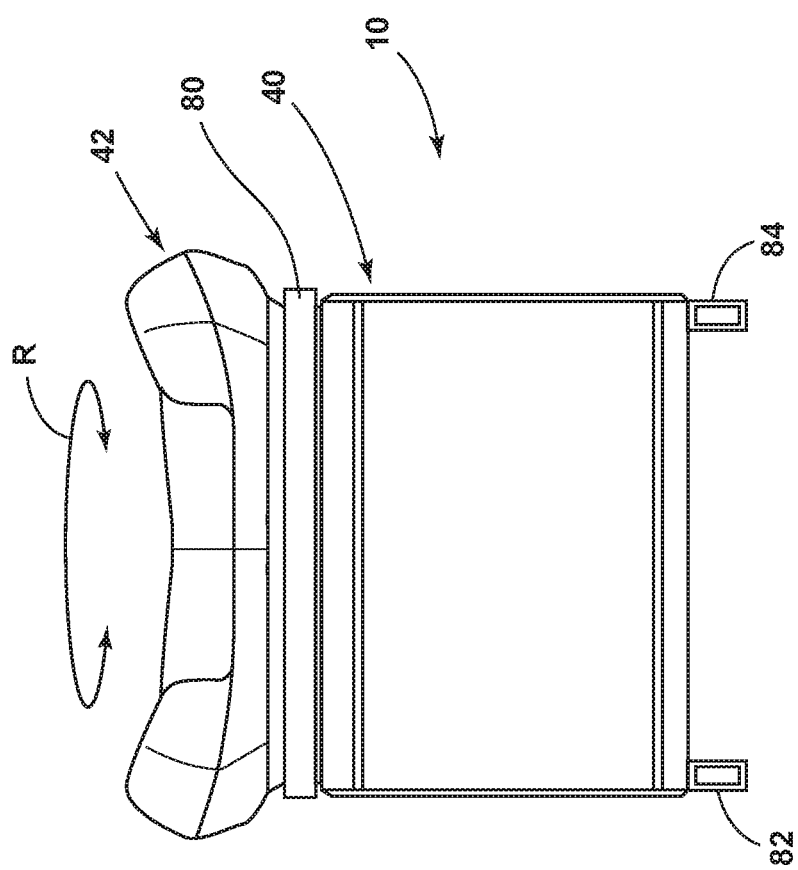
FIG. 6 is a side elevation view of a seat pedestal.

Referring now to FIG. 6, the seat pedestal 10 is shown with the seat portion 42 supported on the base portion 40 by a rotation mechanism 80 that allows for the seat portion 42 to rotate in the direction as indicated by arrow R. Includes first and second coupling members 82, 84 which are configured to couple the seat pedestal 10 to the track system 14 for laterally translating movement therealong.

As further shown in FIG. 6, the side-facing seatback 54 of the first interior trim member 50 (FIGS. 1 and 7) disposed on the first side 12D of the vehicle interior 12A is aligned with the seat pedestal 10. Thus, the seat pedestal 10 moves towards the side-facing seatback 54 as the seat pedestal 10 moves towards the use position (shown in FIGS. 2 and 7) along the track system 14. As a corollary, the seat pedestal 10 moves away from the side-facing seatback 54 as the seat pedestal 10 moves towards the loading position along the track system 14, as shown in FIG. 6. The front and rear seat assemblies 20, 30 disposed on opposed sides of the seat pedestal 10, and the seatback portion 24 of the front seat assembly 20, defining the second interior trim member 28, includes both a front-facing seatback 26 and a rear-facing seatback 58 disposed on opposed sides of the seatback portion 24 of the front seat assembly 20. Thus, the first interior trim member 50 (FIGS. 1 and 7) is positioned substantially perpendicular to the seatback portion 24 of the front seat assembly 20.

Figure 7:
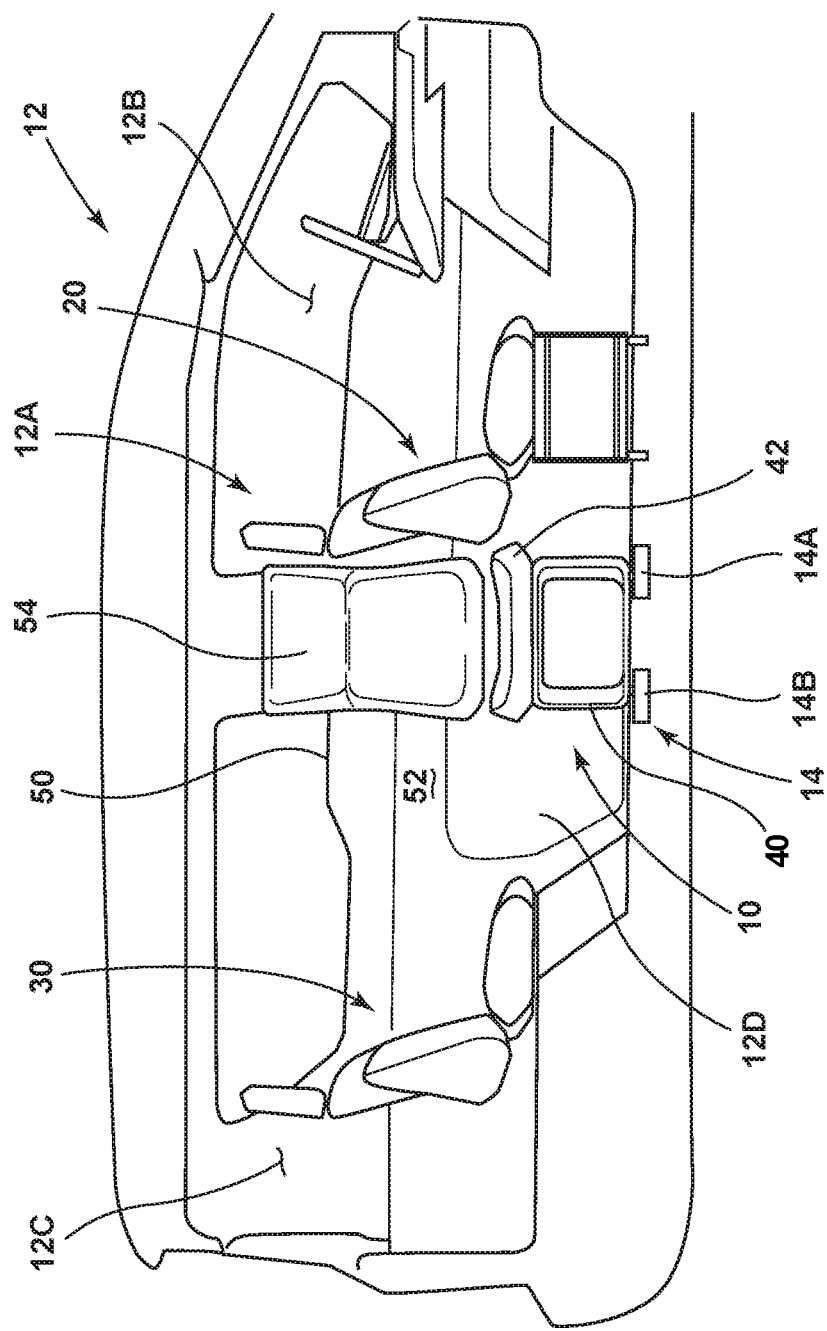
FIG. 7 is a side elevation view of the vehicle interior of FIG. 1 showing the seat pedestal in a first position and a first orientation to provide a first seating configuration.

Referring now to FIG. 7, the vehicle 12 is shown with the seat pedestal 10 in the first position, such that the seat pedestal 10 is disposed adjacent the first interior trim member 50 and the side-facing seatback 54 thereof. Said differently, the seat pedestal 10 is in the first position which correlates to the first end 14C of the track system 14, and the seat portion 42 of the seat pedestal is in the first orientation. In this way, the seat pedestal 10 by the first seating configuration, which is a side-facing seating configuration, when the seat pedestal 10 is positioned as shown in FIG. 7.

As noted above, the first, second and third interior trim members 50, 28 and 70 each include outer surfaces 52, 56 and 72, respectively. On the respective outer surfaces 52, 56 and 72 of the first, second and third interior trim members 50, 28 and 70, the seatbacks 54, 58 and 74 are respectively positioned. Specifically, the seatbacks 54, 58 and 74 are contemplated to be integrated into the first, second and third interior trim members 50, 28 and 70 at the respective outer surfaces 52, 56 and 72 thereof. In this way, it is contemplated that the seatbacks 54, 58 and 74 are fixed in their side-facing configurations (for seatbacks 54 and 74) and the rear-facing configuration (for seatback 58) as disposed on the first, second and third interior trim members 50, 28 and 70. As noted above, it is contemplated that the seatbacks 54, 58 and 74 may include some adjustability in a reclining position or lumbar support, but are contemplated to be fixed in orientation relative to the interior trim member upon which they are disposed.

The outer surface 52 of the first interior trim member 50 faces inwardly into the vehicle interior 12A in a lateral direction, as shown in FIG. 7, and indicated by arrow 60 in FIG. 2. As noted above, the first interior trim member 50 includes the seatback 54 integrated into the outer surface 52 thereof. As integrated into the outer surface 52 of the first interior trim member 50, the seatback 54 thereof is a side-facing seatback as shown in FIGS. 2 and 7. The outer surface 56 of the second interior trim member 28 faces inwardly into the vehicle interior 12A in a rearward direction, as shown in FIG. 2, and indicated by arrow 62. As noted above, the second interior trim member 28 is disposed on the rear portion of the seatback portion 24 of the first seat assembly 20 and includes the seatback 58 integrated into the outer surface 56 thereof. As integrated into the outer surface 56 of the second interior trim member 28, the seatback 58 thereof is a rear-facing seatback as shown in FIG. 2. The outer surface 72 of the third interior trim member 70 faces inwardly into the vehicle interior 12A in a lateral direction, as shown in FIG. 2, and indicated by arrow 64. As noted above, the third interior trim member 70 is disposed on a door 76 of the vehicle 12 and includes the seatback 74 integrated into the outer surface 72 thereof. As integrated into the outer surface 72 of the third interior trim member 70, the seatback 74 thereof is a side-facing seatback as shown in FIG. 2 positioned in an opposed configuration relative to seatback 54. As further noted above, the side-facing seatbacks 74, 54 are positioned in a substantially perpendicular position to the rear-facing seatback 58.

Accordingly, the seat pedestal 10 of the present concept provides for a multi-configurational seating option between otherwise standard first and second seat assemblies 20, 30. While the seat pedestal 10 provides multiple seating options, the seat pedestal 10 has a minimal footprint given its laterally translating capabilities within the vehicle interior 12A.

According to one aspect of the present invention, a vehicle includes a vehicle interior having a front portion, a rear portion, opposed first and second sides and a support surface. A track system is disposed on the support surface and includes at least one track member. The at least one track member is positioned on the support surface substantially spanning a distance defined between the opposed first and second sides of the vehicle interior. A seat pedestal includes a base portion supported on the track system for lateral movement within the vehicle interior. The seat pedestal further includes a seat portion rotatably supported on the base portion. A first interior trim member is positioned along one of the first and second sides of the vehicle interior. The first interior trim member includes a side-facing seatback disposed on an outer surface thereof. A second interior trim member is facing rearwardly within the vehicle interior. The second interior trim member includes a rear-facing seatback disposed on an outer surface thereof.

Embodiments of the first aspect of the invention can include any one or a combination of the following features:
- the side-facing seatback is substantially perpendicular to the rear-facing seatback;
- the first interior trim member is substantially perpendicular to the second interior trim member;
- the base portion of the seat pedestal moves along the track system between a first position, wherein the base portion is positioned adjacent to the side-facing seatback, and a second position, wherein the base portion is positioned adjacent to the rear-facing seatback;
- the seat portion is rotatable between first and second orientations on the base portion, and the seat pedestal provides a first seating configuration when the seat portion is in the first orientation and the base portion is in the first position;
- the seat pedestal provides a second seating configuration that is different than the first seating configuration when the seat portion is in the second orientation and the base portion is in the second position; and
- the seat assembly is positioned in the front portion of the vehicle interior and includes a seat portion and a seatback portion, and the second interior trim member is disposed on a rear portion of the seatback portion of the seat assembly.

According to another aspect of the present invention, a vehicle includes a vehicle interior having opposed first and second sides and a support surface disposed therebetween. A track system is laterally disposed on the support surface. A seat pedestal includes a base portion supported on the track system for lateral movement within the vehicle interior. The seat pedestal further includes a seat portion rotatably supported on the base portion. A first interior trim member includes an outer surface facing inwardly into the vehicle interior in a lateral direction. The first interior trim member includes a seatback integrated into the outer surface thereof. A second interior trim member includes an outer surface facing inwardly into the vehicle interior in a rearward direction. The second interior trim member includes a seatback integrated into the outer surface thereof.

Embodiments of the second aspect of the invention can include any one or a combination of the following features:
- the seat portion is rotatable between first and second orientations on the base portion, and the seat pedestal provides a first seating configuration when the seat portion is in the first orientation and the base portion is in the first position;
- the seat pedestal provides a second seating configuration that is different than the first seating configuration when the seat portion is in the second orientation and the base portion is in the second position;
- the track system includes first and second ends with an intermediate portion disposed therebetween, wherein the first end of the track system corresponds to the first position of the base portion of the seat pedestal, and the intermediate portion of the track system corresponds to the second position of the base portion of the seat pedestal;
- the seat pedestal provides a loading configuration when the seat portion of the seat pedestal is in the first orientation and the base portion of the seat pedestal is in a third position that corresponds to the second end of the track system;
- the first interior trim member is disposed on the first side of the vehicle interior, and a third interior trim member is disposed on the second side of the vehicle interior, the third interior trim member includes an outer surface facing inwardly into the vehicle interior in a lateral direction, and the third interior trim member includes a seatback integrated into the outer surface thereof; and
- the seat pedestal provides a third seating configuration when the seat portion of the seat pedestal is in a third orientation that is opposed to the first orientation and the base portion of the seat pedestal is in the third position.

According to yet another aspect of the present invention, a vehicle includes a vehicle interior having opposed first and second sides and a support surface disposed therebetween. A track system is laterally disposed on the support surface. A seat pedestal is supported on the track system for lateral movement within the vehicle interior between a use position and a loading position. An interior trim member is disposed on the first side of the vehicle interior and includes a seatback aligned with the seat pedestal. The seat pedestal moves towards the seatback as the seat pedestal moves towards the use position along the track system. The seat pedestal moves away from the seatback as the seat pedestal moves towards the loading position along the track system.

Embodiments of the third aspect of the invention can include any one or a combination of the following features:
- the front and rear seat assemblies are disposed on opposed sides of the seat pedestal;
- the front seat assembly includes a seatback portion having a front-facing seatback and a rear-facing seatback disposed on opposed sides of the seatback portion;
- the interior trim member is positioned substantially perpendicular to the seatback portion of the front seat assembly;
- the seat pedestal further includes a seat portion that is rotatable between a first orientation facing a lateral direction and a second orientation facing a rearward direction; and
- the seat pedestal provides a first seating configuration when the seat pedestal is in the use position and the seat portion of the seat pedestal is in the first orientation, and the seat pedestal provides a second seating configuration when the seat pedestal is disposed adjacent to the rear-facing seatback of the front seat assembly and the seat portion of the seat pedestal is in the second orientation.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
   a vehicle interior having a front portion, a rear portion, opposed first and second sides and a support surface;
   a track system disposed on the support surface and having at least one track member, wherein the at least one track member is positioned on the support surface substantially spanning a distance defined between the opposed first and second sides of the vehicle interior;
   a seat pedestal having a base portion supported on the track system for lateral movement within the vehicle interior, wherein the seat pedestal further includes a seat portion rotatably supported on the base portion;
   a first interior trim member positioned along one of the first and second sides of the vehicle interior, wherein the first interior trim member includes a side-facing seatback disposed on an outer surface thereof;
   a second interior trim member facing rearwardly within the vehicle interior, wherein the second interior trim member includes a rear-facing seatback disposed on an outer surface thereof; and
   wherein the base portion of the seat pedestal moves along the track system between a first position, wherein the base portion is positioned adjacent to the side-facing seatback, and a second position, wherein the base portion is positioned adjacent to the rear-facing seatback, and further wherein the seat pedestal moves away from the rear-facing seatback as the base portion of the seat pedestal moves along the track system from the second position to the first position, and further wherein the seat pedestal moves away from the side-facing seatback as the base portion of the seat pedestal moves along the track system from the first position to the second position.

2. The vehicle of claim 1, wherein the side-facing seatback is substantially perpendicular to the rear-facing seatback.

3. The vehicle of claim 1, wherein the first interior trim member is substantially perpendicular to the second interior trim member.

4. The vehicle of claim 1, wherein the base portion of the seat pedestal moves along the track system between a first position, wherein the base portion is positioned adjacent to the side-facing seatback, and a second position, wherein the base portion is positioned adjacent to the rear-facing seatback.

5. The vehicle of claim 4, wherein the seat portion is rotatable between first and second orientations on the base portion, and further wherein a first seating configuration is defined between the side-facing seatback and the seat portion of the seat pedestal when the seat portion is in the first orientation and the base portion is in the first position.

6. The vehicle of claim 5, wherein a second seating configuration is defined between the rear-facing seatback and the seat portion of the seat pedestal when the seat portion is in the second orientation and the base portion is in the second position.

7. The vehicle of claim 1, including:
   a seat assembly positioned in the front portion of the vehicle interior, wherein the seat assembly includes a seat portion and a seatback portion, and further wherein the second interior trim member is disposed on a rear portion of the seatback portion of the seat assembly.

8. A vehicle, comprising:
   a vehicle interior having opposed first and second sides and a support surface disposed therebetween;
   a track system laterally disposed on the support surface;
   a seat pedestal having a base portion supported on the track system for lateral movement within the vehicle interior between first and second positions, wherein the seat pedestal further includes a seat portion rotatably supported on the base portion;
   a first interior trim member having an outer surface facing inwardly into the vehicle interior in a lateral direction, wherein the first interior trim member includes a seatback integrated into the outer surface thereof; and
   a second interior trim member having an outer surface facing inwardly into the vehicle interior in a rearward direction, wherein the second interior trim member includes a seatback integrated into the outer surface thereof, and further wherein the seat pedestal moves away from the seatback of the first interior trim member and towards the seatback of the second interior trim member as the base portion moves from the first position to the second position, and further wherein the seat pedestal moves away from the seatback of the second interior trim member and towards the seatback of the first interior trim member as the base portion moves from the second position to the first position.

9. The vehicle of claim 8, wherein the seat portion is rotatable between first and second orientations on the base portion, and further wherein the seat pedestal provides a first seating configuration when the seat portion is in the first orientation and the base portion is in the first position.

10. The vehicle of claim 9, wherein the seat pedestal provides a second seating configuration that is different than the first seating configuration when the seat portion is in the second orientation and the base portion is in the second position.

11. The vehicle of claim 10, wherein the track system includes first and second ends with an intermediate portion disposed therebetween, and further wherein the first end of the track system corresponds to the first position of the base portion of the seat pedestal, and the intermediate portion of the track system corresponds to the second position of the base portion of the seat pedestal.

12. The vehicle of claim 11, wherein the seat pedestal provides a loading configuration when the seat portion of the seat pedestal is in the first orientation and the base portion of the seat pedestal is in a third position that corresponds to the second end of the track system.

13. The vehicle of claim 12, wherein the first interior trim member is disposed on the first side of the vehicle interior, and further wherein a third interior trim member is disposed on the second side of the vehicle interior, the third interior trim member having an outer surface facing inwardly into the vehicle interior in a lateral direction, wherein the third interior trim member includes a seatback integrated into the outer surface thereof.

14. The vehicle of claim 13, wherein the seat pedestal provides a third seating configuration when the seat portion of the seat pedestal is in a third orientation that is opposed to the first orientation and the base portion of the seat pedestal is in the third position.

15. A vehicle, comprising:
   a vehicle interior having opposed first and second sides and a support surface disposed therebetween;
   a track system laterally disposed on the support surface;
   a seat pedestal supported on the track system for lateral movement within the vehicle interior between a use position and a loading position; and
   an interior trim member disposed on the first side of the vehicle interior and having a seatback aligned with the seat pedestal, wherein the seat pedestal moves towards the seatback as the seat pedestal moves towards the use position along the track system, and further wherein the seat pedestal moves away from the seatback as the seat pedestal moves towards the loading position along the track system.

16. The vehicle of claim 15, including:
front and rear seat assemblies disposed on opposed sides of the seat pedestal.

17. The vehicle of claim 16, wherein the front seat assembly includes a seatback portion having a front-facing seatback and a rear-facing seatback disposed on opposed sides of the seatback portion.

18. The vehicle of claim 17, wherein the interior trim member is positioned substantially perpendicular to the seatback portion of the front seat assembly.

19. The vehicle of claim 18, wherein the seat pedestal further includes a seat portion that is rotatable between a first orientation facing a lateral direction and a second orientation facing a rearward direction.

20. The vehicle of claim 19, wherein the seat pedestal provides a first seating configuration when the seat pedestal is in the use position and the seat portion of the seat pedestal is in the first orientation, and further wherein the seat pedestal provides a second seating configuration when the seat pedestal is disposed adjacent to the rear-facing seatback of the front seat assembly and the seat portion of the seat pedestal is in the second orientation.

\* \* \* \* \*